United States Patent [19]

Riew et al.

[11] Patent Number: 5,080,968

[45] Date of Patent: Jan. 14, 1992

[54] COMPOSITES OF VINYL RESINS AND ELASTOMER-COATED FIBERS

[75] Inventors: Changkiu K. Riew, Akron; Alan R. Siebert, Orange Village, both of Ohio; Frrederick J. McGarry, Weston, Mass.; Philip L. Kinson, Brecksville, Ohio

[73] Assignee: The B. F. Goodrich Company, Akron, Ohio

[21] Appl. No.: 481,263

[22] Filed: Feb. 20, 1990

Related U.S. Application Data

[63] Continuation-in-part of Ser. No. 403,060, Sep. 5, 1989, Pat. No. 5,000,981, which is a continuation of Ser. No. 148,251, Jan. 25, 1988, abandoned.

[51] Int. Cl.$^5$ .............................. B32B 27/00
[52] U.S. Cl. ..................... 428/323; 428/375; 428/378; 428/392; 428/394; 428/395; 525/109; 525/276; 525/317; 525/530
[58] Field of Search .............. 428/288, 290, 323, 392, 428/375, 378, 394, 395, 396; 525/109, 276, 317, 530

[56] References Cited

U.S. PATENT DOCUMENTS

| | | | |
|---|---|---|---|
| 3,135,716 | 6/1964 | Uraneck et al. | 260/45.5 |
| 3,155,728 | 11/1964 | Lesesne | 260/584 |
| 3,235,589 | 2/1966 | Berenbaum et al. | 260/533 |
| 3,236,895 | 2/1966 | Lee et al. | 260/584 |
| 3,285,949 | 11/1966 | Siebert | 260/165.4 |
| 3,316,185 | 4/1967 | Reinking | 260/2 |
| 3,436,359 | 4/1969 | Hubin et al. | 260/2 |
| 3,654,370 | 4/1972 | Yenbay | 260/584 B |
| 3,673,280 | 6/1972 | Minton et al. | 525/276 |
| 3,928,684 | 12/1975 | Büning et al. | 428/392 |
| 3,966,837 | 6/1976 | Riew et al. | 525/109 |
| 4,018,847 | 4/1977 | Messerly | 260/830 |
| 4,055,541 | 10/1977 | Riew | 260/47 |
| 4,058,657 | 11/1977 | Ireland | 526/263 |
| 4,088,708 | 5/1978 | Riew | 260/836 |
| 4,119,592 | 10/1978 | Murphy | 260/18 |
| 4,129,670 | 12/1978 | Riew | 525/530 |
| 4,133,957 | 1/1979 | Riew | 544/357 |
| 4,221,885 | 9/1980 | Schimmel et al. | 525/328 |
| 4,260,700 | 4/1981 | Cassutt et al. | 525/113 |
| 4,320,047 | 3/1982 | Murphy et al. | 523/457 |
| 4,455,343 | 6/1984 | Temple | 428/285 |
| 4,457,970 | 7/1984 | Das et al. | 428/290 |
| 4,481,148 | 11/1984 | Riew | 260/465.4 |
| 4,487,797 | 12/1984 | Watson | 428/392 |
| 4,521,490 | 6/1985 | Pocius et al. | 428/416 |
| 4,801,627 | 1/1989 | Rahrig et al. | 428/392 |

FOREIGN PATENT DOCUMENTS

0320873 12/1988 European Pat. Off.

Primary Examiner—Paul J. Thibodeau
Assistant Examiner—Hoa T. Le
Attorney, Agent, or Firm—Joe A. Powell

[57] ABSTRACT

Fiber reinforced composites are comprised of a vinyl resin composition and fibrous reinforcement material which is coated with a uniformly thin and continuous elastomeric coating. The coating is prepared from an aqueous dispersion containing a reactive liquid polymer composition, an epoxy resin and a curing agent.

12 Claims, No Drawings

COMPOSITES OF VINYL RESINS AND ELASTOMER-COATED FIBERS

This application is a continuation-in-part of U.S. patent application Ser. No. 07/403,060, filed Sept. 5, 1989, now U.S. Pat. No. 5,000,981, which is a continuation of U.S. patent application Ser. No. 07/148,251, filed Jan. 25, 1988, abandoned.

BACKGROUND OF THE INVENTION

This invention relates to composite articles of vinyl resin compositions and fibers coated with an elastomeric coating.

Vinyl resin compositions are thermoplastics and can be molded for use in a variety of products. In some uses stiffness and strength, i.e., load bearing capability, are desired, and so the resins are reinforced with fibrous reinforcement materials to form a composite. Unfortunately, adding the fibers lowers the impact and crack resistance of the composite. Additionally, the adhesion between the resin and fibrous reinforcement can be undesirably weak. Thus, composites which are reinforced with fibers which will not have lower impact and crack resistance and in which there is good adhesion between the resin and the fibers are desired.

Polymers of lower molecular weight which are reactive are known in the art. For example, U.S. Pat. No. 4,133,957 describes amine-terminated liquid polymers represented by the formula

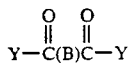

wherein Y is a univalent radical obtained by removing hydrogen from an amine group of an aliphatic, alicyclic, heterocyclic or aromatic amine containing at least two secondary or mixed primary and secondary amine groups with no more than one primary amine group per molecule, and "B" is a polymeric backbone comprising carbon-carbon linkages. Other amine-containing liquid polymers having carbon-carbon linkage backbones and their uses are described in U.S. Pat. No. 4,221,885. The B. F. Goodrich Company markets a line of amine-terminated reactive liquid polymers under the trademark HYCAR ® reactive liquid polymers.

Amine-containing polymers are also known which have carbon-oxygen linkages in the polymeric backbones. An example of this type of amine-containing liquid polymer is the polyether polyamines described in U.S. Pat. No. 3,436,359. Other examples of amine-containing liquid polymers having carbon-oxygen backbone linkages and their uses are described in U.S. Pat. Nos. 3,155,728; 3,236,895; 3,654,370; and 4,521,490. The '370 patent describes its amine-containing polymers as polyoxyalkylene polyamines. The '490 patent describes its amine-containing polymers as poly(oxyhydrocarbolene)diamines. The Jefferson Chemical Company subsidiary of Texaco, Inc. markets a line of amine-containing polymers under the Trademark Jeffamine ® polyoxypropyleneamines.

Carboxyl-containing reactive polymers are also known in the art. For example, U.S. Pat. Nos. 3,235,589 and 3,285,949 describe carboxyl-terminated liquid polymers having a polymeric backbone comprising carbon-carbon linkages prepared by polymerizing dienes with or without vinyl nitriles and/or styrene in the presence of a bis-azocyanoalkyl acid initiator or an alkylene dicarboxylic acid peroxide. Carboxyl-containing polymers can also be prepared using the process described in U.S. Pat. No. 3,135,716 wherein monomers are polymerized using an organo-polyalkali metal compound to yield a polymer having a terminal alkali metal, and then post-reacting the polymer to form a terminal carboxyl group. The B. F. Goodrich Company markets a line of carboxyl-terminated reactive liquid polymers under the trademark HYCAR ® reactive liquid polymers.

The above polymers share some common characteristics. All are of lower molecular weight, ranging from about 200 to about 10,000 number average molecular weight. In many cases, the polymers are liquids at room temperature (about 25° C.). More importantly, all of the polymers are reactive, i.e. they can react, chain-extend, or cure with other chemicals, materials or polymers to form elastomeric or plastic solids. The above-referenced patents readily show and describe curing mechanisms and cure systems for the polymers. The reactive polymers can even co-cure with themselves as shown in U.S. Pat. No. 4,058,657. Often, the material used as a curative for the reactive polymers is an epoxy resin. For example, in addition to the above-mentioned patents, U.S. Pat. Nos. 3,316,185; 4,018,847; 4,055,541; 4,088,708; 4,119,592; 4,260,700; and 4,320,047 all show cures of reactive polymers using epoxy resins and other curing agents.

The reactive polymers are useful as components in castable systems, as tougheners or flexibilizers for epoxy and polyester resins in structural plastics, and in paints, coatings, sealants, adhesives, and the like.

The reactive polymers have been employed as impact or stress-fracture modifiers for brittle resins. In this work, they have been used in their pure liquid form or in the form of solutions. An example of such work is described in the book published by the American Chemical Society entitled "Rubber Modified Thermoset Resins" as part of the Advances in Chemistry Series, No. 208, edited by C. Keith Riew and John K. Gillham. Another reference on this subject is the article published in the ACS periodical, Rubber Chemistry and Technology, entitled "Amine-Terminated Reactive Liquid Polymers; Modification of Thermoset Resins" Vol. 54, No. 2, May-June 1981, by C. K. Riew.

The polymers can also be utilized in the form of a water-dispersion. One method that can be used to prepare water-dispersed compositions from liquid polymers involves mixing the polymer with water and soap using a high speed mixer such as an Eppenbach homogenizer or a Minisonic homogenizer. This process is not satisfactory as it introduces high levels of soap into the final composition.

A recent process has been developed to prepare water-dispersions of reactive polymers by first forming a "hydrophilic salt" of the polymer and then dispersing it in water. This process is described in copending applications Ser. Nos. 134,385 and 134,412, filed on Dec. 17, 1987. This process can be readily used as described therein or with minor variations to form water-dispersed compositions of amine-containing and carboxyl-containing reactive liquid polymers.

There have been attempts in the past at using reactive liquid polymers in forming films or coatings on substrates. When these polymers are used in their pure liquid form, uniformly thin films are not readily obtained. If the reactive polymers are used in the form of organic solutions, uniformly thin and continuous films are also not conveniently obtained. Further, the organic solvents are employed at high levels, over 90% and up to 99.5% by weight of the solution, which causes environmental and safety problems.

Another method of forming films on fibers is by electrodeposition or electropolymerization. In this method, a conductive fiber or a fiber with a conductive coating thereon is placed into an electrolyte solution containing electropolymerizable monomers. A current is applied and the monomers polymerize onto the fiber surface. An example of such a process is described in the article in *Polymer Composites*, February 1987, Vol. 8, No. 1, entitled "Application of Ductile Polymeric Coatings Onto Graphite Fibers" by J. P. Bell et al. A disadvantage of such a process is that the fiber must be conductive and the monomers employed must be compatible with the technique; i.e. electropolymerizable and dispersible in an electrolyte solution.

Also, reactive polymers have been used as impact modifiers, not in a "bulk" manner but as an elastomeric film on a reinforcing fiber. This work was first done and described in a February, 1985 Thesis by J. K. Kawamoto et al entitled "Impact Resistance of Rubber Modified Carbon Fiber Composite" published by the School of Engineering, Massachusetts Institute of Technology. In the study, a dilute solution (0.5% to 5.0% by weight) of a carboxyl-terminated poly(butadiene-acrylonitrile) liquid polymer in xylene was used to coat carbon fibers, which were then used to prepare epoxy composites which were tested for their impact strength and other properties. Although the study demonstrated the concept, a better process to achieve more uniformly thin and continuous coatings on fibers is desired.

Also, new composites of PVC which would have a combination of stiffness, impact resistance and crack resistance are desired and would be beneficial to the appliance and building materials industries.

SUMMARY OF THE INVENTION

In one aspect, this invention is a fiber reinforced vinyl resin composite comprising a vinyl resin composition and a fibrous reinforcement material coated with a uniformly thin and continuous cured elastomeric coating. The coating composition is prepared from an aqueous dispersion containing a reactive liquid polymer composition, epoxy resin and a curing agent.

The composites of this invention can be molded into a variety of products and have a unique combination of stiffness, flexural strength and impact toughness. Examples of such products which can be fabricated from these composites are housings for appliances and computers, building materials such as window components, and, generally, other products formed in extrusion, injection and compression molding operations.

DETAILED DESCRIPTION OF THE INVENTION

The vinyl resin compositions useful in this invention are thermoplastic and are the polymerization products of at least one monomer containing a polymerizable vinyl group. The resins can be homopolymers of one vinyl monomer or copolymers of a vinyl monomer and one or more copolymerizable comonomers which contain one or more polymerizable vinyl groups or alloys of two or more polymeric compositions, wherein at least one polymeric composition is a vinyl resin. Preferably, less than 50% by weight of the comonomer is used to prepare the vinyl resin compositions useful in this invention. Preferred vinyl resins are vinyl halide resins, chlorinated vinyl halide resins and vinylidene halide resins. Examples of suitable comonomers for vinyl halides and chlorinated vinyl halides include olefins; dienes; vinyl esters; vinyl aromatic compounds, such as styrene and chlorostyrene; alkyl vinyl ethers; a-,$\beta$-olefinically unsaturated nitriles; esters of a-,$\beta$-olefinically unsaturated carboxylic acids; haloalkyl acrylates; methacrylate esters; amide monomers derived from a-,$\beta$-olefinically unsaturated carboxylic acids such as acrylamide, methacrylamide and N-propyl acrylamide, and a,$\beta$-gamma olefinically unsaturated N-alkylol amides.

Preferred vinyl halide resin compositions are homopolymers of polyvinyl chloride and chlorinated polyvinyl chloride, and grafted copolymers of polyvinyl chloride, or chlorinated polyvinyl chloride and less than 50% by weight of a polyolefin. Preferred vinyl resin alloys are alloys in which the individual resins are miscible or compatible, and include alloys of polyvinyl chloride with a terpolymer of α-methyl styrene-styrene-acrylonitrile; polyvinyl chloride with a copolymer of polymethyl methacrylate-glutarimide such as HT510 ® sold by Rohm and Haas Co.; polyvinyl chloride and a tetrapolymer of α-methyl styrene-styrene-acrylonitrile-methyl methacrylate; polyvinyl chloride and acrylonitrile-butadiene-styrene; polyvinyl chloride and styrene-acrylonitrile copolymers; and polyvinyl chloride and a terpolymer of styrene-maleic anhydridemethyl methacrylate. Other preferred alloys can be prepared by substituting chlorinated polyvinyl chloride for the polyvinyl chloride in the above-mentioned alloys. These alloying polymeric compositions can be useful for raising the heat distortion temperature of the vinyl resin composition. Of course, other alloying compositions will be useful for other purposes. As used in this invention, the alloying polymeric composition is used in an amount to perform its function but less than an amount which reduces substantially the characteristics of the vinyl resin. This amount can vary according to the specific vinyl resin and alloying polymeric composition employed, but typically ranges from about 5 to about 50 weight percent, and preferably from about 10 to about 30 weight percent based on the total weight of the alloy.

The vinyl resins of this invention can also contain functional additives such as impact modifiers, pigments, heat stabilizers, lubricants, processing aids, fillers and plasticizers. The types of compounds useful for performing the desired functions are known in the art.

The vinyl resins are prepared by known processes such as by mass or batch polymerization, suspension polymerization, emulsion polymerization and the like. To prepare the preferred vinyl halide resins, the vinyl halide monomer is polymerized by using a free-radical catalyst. Suitable catalysts are known, and examples include the organic peroxides such as benzoyl peroxide, and aliphatic azo compounds such as $\alpha,\alpha'$-azodiisobutyronitrile.

In the composites of this invention, the vinyl resin composition is present in a matrix-forming amount. This amount can vary, but typically ranges from about 30 to about 97 weight percent based on the total weight of the composite.

The fibrous reinforcement material useful in this invention comprises the fibers having a uniformly thin and continuous elastomeric coating thereon. The fibers employed can be any solid fiber. The types of fibers are described later in this specification. The cured elastomeric coating composition on the fiber is prepared from an aqueous dispersion of a reactive liquid polymer composition, an epoxy resin and a curing agent. By aqueous dispersion is meant a mixture of the ingredients in water which is stable. The mixture can range in form from a true solution of the ingredients in water to a microdispersion or microemulsion of the ingredients in water as can be readily observed by the Tyndall effect. The aqueous dispersion can be fully transparent due to miscibility of the ingredients in water or to matching refractive indices of the ingredients.

The reactive liquid polymer composition is a water-dispersed composition and is comprised of a lower molecular weight reactive polymer. The reactive polymer has the ability to form a water-dispersed composition and to react to form an elastomer having a Tg value of below about 0° C. The polymers which are suitable for use in the reactive liquid polymer compositions in this invention can be represented by the following general formula:

$$Y_n\text{—PB)}$$

wherein Y is either a univalent, reactive radical selected from the group consisting of carboxyl groups and amine groups or a monomeric unit of the polymeric backbone; n is an integer from 1 to about 10; and PB is a polymeric backbone comprising carbon-carbon and/or carbon-oxygen linkages. The reactive polymers have a number average molecular weight of from about 200 to about 10,000 measured using a Vapor Pressure Osmometer or a Gel Permeation Chromatographic technique; have a Tg value using a Differential Thermal Analysis technique of below 0° C.; and are liquids or low melting solids at ambient or room temperature (about 25° C.). Generally, the polymeric backbone linkages comprise at least about 70% by weight and more typically at least about 90% by weight of the total polymer, and the reactive groups comprise from a minimum of about 0.5% to about 10% or more by weight of the total polymer. The polymer can contain internal, pendant and/or terminal reactive groups, and can contain a mix of two or more reactive groups.

Amine-containing polymers are a preferred type of preferred reactive polymer useful in this invention. Examples of amine-containing polymers having polymeric backbones comprising carbon-carbon linkages are described in U.S. Pat. No. 4,133,957, which description is hereby incorporated by reference. Such polymers are further described in U.S. Pat. No. 4,018,847. These polymers are readily prepared by the reaction of a carboxyl-containing polymer with a diamine or by other methods adequately described in the above-mentioned patents.

Amine-containing polymers having polymeric backbones comprising carbon-oxygen linkages are prepared and described in U.S. Pat. Nos. 3,155,728; 3,436,359; and 3,654,370 which descriptions are hereby incorporated by reference. Such polymers are further disclosed in U.S. Pat. Nos. 3,316,185; and 4,521,490.

The method of preparing the amine-containing polymers is not critical to this invention. Any amine-containing polymers meeting the specifications stated herein can be formed into water-dispersed compositions and used in this invention using the method described herein.

The amine-containing polymers can have pendant amine groups (i.e., amine groups which are attached to the polymeric backbone as side groups) and/or terminal amine groups (i.e., amine groups which are attached to the ends of the polymeric backbone). The amine-terminated polymers can be mono-functional; i.e. having a primary or secondary amine group at one terminal end of the molecule, or di-functional; i.e. having a primary and/or secondary amine group at each terminal end of the molecule. Hence, the total amine functionality of the more preferred amine-terminated polymers can range from 1 to about 10 or more, but more preferably ranges from 1 to about 3 amine groups per molecule.

The amine-terminated polymers having carbon-oxygen linkages in the backbone may have a wider range of number average molecular weight than the amine-terminated polymers having carbon-carbon backbones. For example, the polyglycolamine polymer sold as Jeffamine ® polyoxypropyleneamine D-2000 has an average molecular weight of about 2000, and a viscosity of about 265 centipoise (measured at 25° C. using a Brookfield RVT viscometer with spindle No. 1 at 20 rpm). The polytetramethyleneoxide polymers sold by Minnesota Mining and Manufacturing are low-melting solids at room temperature and have viscosities of up to 100,000 cps at 65° C.

Carboxyl-containing polymers are another type of reactive polymer useful in this invention. Examples of such polymers having polymeric backbones comprising carbon-carbon linkages are described in U.S. Pat. Nos. 3,285,949 and 3,235,589, which descriptions are hereby incorporated by reference. Such polymers are further described in U.S. Pat. No. 4,119,592. These polymers are readily prepared by the reaction of vinylidene-containing monomers in the presence of a bis-azocyano acid such as azodicyanovaleric acid or by other methods adequately described in U.S. Pat. Nos. 3,135,716 and 3,235,589. The method of preparing the carboxyl-containing polymer is not critical to this invention. Any carboxyl-containing polymers meeting the specifications stated herein can be formed into water-dispersed or aqueous dispersion compositions and used in this invention using the method disclosed herein.

The carboxyl-containing polymers can have pendant carboxyl groups (i.e., carboxyl groups which are attached to the polymeric backbone as side groups) and/or terminal carboxyl groups (i.e., carboxyl groups which are attached to the ends of the polymeric backbone). The carboxyl-terminated polymers can be mono-functional; i.e. having a carboxyl group at one terminal end of the molecule, or di-functional; i.e. having a carboxyl group at each terminal end of the molecule. Also, the mono-functional or di-functional polymer can contain pendant carboxyl groups. Hence, the total carboxyl functionality of the more preferred carboxyl-terminated polymers can range from 1 to about 10 or more, but more preferably ranges from 1 to about 3 carboxyl groups per molecule.

If the reactive polymers have polymeric backbones comprised of carbon-carbon linkages, the preferred polymeric backbone is derived from interpolymerization of vinylidene monomers. Examples of vinylidene monomers are (a) monoolefins containing 2 to 14 carbon atoms, more preferably 2 to 8 carbon atoms, such as ethylene, propylene, isobutylene, 1-butene, 1-pentene, 1-hexene, 1-heptene, and the like; (b) dienes containing 4 to 10 carbon atoms, more preferably 4 to 8 carbon atoms, such as butadiene, isoprene (2-methyl-1,3-butadiene), 2-isopropyl-1,3-butadiene, chloroprene (2-chloro-,3-butadiene), and the like; (c) vinyl and allyl esters of carboxylic acids containing 2 to 8 carbon atoms such as vinyl acetate, vinyl propionate, allyl acetate, and the like; (d) vinyl and allyl ethers of alkyl radicals containing 1 to 8 carbon atoms such as vinyl methyl ether, allyl methyl ether, and the like, and (e) acrylates having the formula

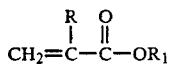

wherein R is hydrogen or an alkyl radical containing 1 to 3 carbon atoms, such as methyl, ethyl, propyl, and isopropyl, and $R^1$ is an alkyl radical containing 1 to 18 carbon atoms, more preferably 1 to 8 carbon atoms, or an alkoxyalkyl, alkylthioalkyl, or cyanoalkyl radical containing 2 to 12 carbon atoms, more preferably 2 to 8 carbon atoms. Even more preferably $R^1$ is hydrogen or an alkyl radical containing 1 to 8 carbon atoms. Examples of suitable acrylates include ethyl acrylate, butyl acrylate, hexyl acrylate, 2-ethylhexyl acrylate, dodecyl acrylate, octadecyl acrylate, methoxyethyl acrylate, butoxyethyl acrylate, hexylthioethyl acrylate, α-cyanoethyl acrylate, cyanooctyl acrylate, methyl methacrylate, ethyl methacrylate, octyl methacrylate, and the like. Often two or more types of these polymerized monomeric units are contained in the polymeric backbone.

The vinylidene monomers described above may be readily polymerized with up to about 50% by weight and more preferably up to about 35% by weight of at least one comonomer selected from the group consisting of (f) vinyl aromatics having the formula

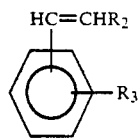

wherein $R_2$ is hydrogen or methyl and $R_3$ is hydrogen, halogen or an alkyl radical containing from 1 to 4 carbon atoms, such as styrene, α-methyl styrene, chlorostyrene, vinyl toluene, and the like; (g) vinyl nitriles having the formula

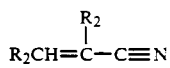

such as acrylonitrile and methacrylonitrile; (h) vinyl halides such as vinyl bromide, vinyl chloride, vinyl fluoride and the like; (i) vinyl acids such as acrylic acid, methacrylic acid, and itaconic acid; (j) divinyls and diacrylates such as divinyl benzene, divinyl ether, diethylene glycol diacrylate, and the like; (k) amines of a,β-olefinically unsaturated carboxylic acids containing 2 to 8 carbon atoms such as acrylamide, and the like; and (l) allyl alcohol, and the like. Polymer compositions having polymeric backbone derived from polymerized units of a major amount of at least one vinylidene monomer listed in (a) to (e) with a minor amount of at least one comonomer listed in (f) to (l) are within the scope of this invention.

The choice of the vinylidene monomers interpolymerized into the polymeric backbone is such that the Tg of the reactive polymer is below 0° C. The Tg value of a homo- or interpolymer is readily determinable by Differential Thermal Analysis, or it can be calculated from knowledge of the Tg of the homopolymer of the individual monomers. An equation for calculating the Tg of copolymers is given on page 27 of the book "*Mechanical Properties of High Polymers*" by L. E. Neilsen, published by Reinhold Publishing Corp., 1967. The Tg value of many homopolymers are listed in the Tables given in Chapter 2 of the book.

Examples of interpolymerized polymeric backbones of carbon-carbon linkages obtained from interpolymerization of vinylidene monomers include polyethylene, polyisobutylene, polyisoprene, polybutadiene, poly(vinyl ethyl ether), poly(ethylacrylate) and poly(butylacrylate) as well as polymers of butadiene and acrylonitrile; butadiene and styrene; butadiene, acrylonitrile, and acrylic acid; vinyl acetate and isoprene; vinyl acetate and chloroprene; methyl acrylate and butadiene; methyl acrylate and ethyl acrylate; methyl acrylate and butyl acrylate; methyl acrylate and 2-ethylhexyl acrylate; ethyl acrylate and ethylene; ethyl acrylate and isobutylene; ethyl acrylate and isoprene; ethyl acrylate and butadiene; ethyl acrylate and vinyl acetate; ethyl acrylate and styrene; ethyl acrylate and chlorostyrene; ethyl acrylate, styrene and butadiene; ethyl acrylate and n-butyl acrylate; ethyl acrylate, n-butyl acrylate and 2-ethylhexyl acrylate; ethyl acrylate and 2-ethylhexyl acrylate; ethyl acrylate and acrylic acid; ethyl acrylate and acrylamide; butyl acrylate and styrene; butyl acrylate and acrylonitrile; butyl acrylate and vinyl chloride, and the like.

The most preferred reactive polymers are the amine-terminated and carboxyl-terminated polymers having polymeric backbones comprised of carbon-carbon linkages derived from interpolymerized units of from about 50% to about 99.6% by weight of a diene such as isoprene or butadiene, and up to about 40% by weight of a vinyl nitrile such as acrylonitrile or a vinyl aromatic such as styrene, and up to 10% by weight of a vinyl acid such as acrylic acid, and having a carboxyl or amine content of from about 0.4% to about 10% by weight, all weights based upon the total weight of the polymer. These polymers have a number average molecular weight of from about 1000 to about 5000, and a viscosity of from about 1000 to about 500,000 centipoise (measured at 27° C. using a Brookfield RVT viscometer with spindle no. 7 at 20 rpm).

The reactive liquid polymer composition useful in this invention comprises (1) the reactive polymer, (2) a select solvent, (3) a dispersing agent, and (4) water. The solvent used to prepare the reactive liquid polymer compositions has the unusual property of being both water and organic soluble, that is having a balanced hydrophobic-hydrophilic character. Example of solvents having the above-described properties include the glycol ethers such as 2-propoxy-1-methyl ethanol, 2-propoxyethanol and 2-butoxy ethanol which is commercially known as butyl cellosolve.

The solvent is used in the reactive liquid polymer composition at a level sufficient to provide a stable dispersed composition. If too little solvent is employed, the product composition is typically unstable and exhibits two phases. Preferably, at least 10 parts of solvent by weight based on 100 parts by weight of polymer is employed. More preferably, the solvent is used in the range of about 50 to about 500 parts by weight based on 100 parts by weight of the polymer. The upper amount of solvent used is limited basically by practical considerations. Excellent compositions were obtained when employing about 100 parts by weight of the solvent per 100 parts by weight of the reactive polymer.

The third ingredient of the reactive liquid polymer composition is a dispersing agent. This agent is an acidic or basic compound, as further described herein, which is capable of forming a salt with the functional group(s) on the reactive polymer. The dispersing agent is not a traditional soap. The use of these traditional soaps would cause interphase adhesion problems among the matrix resin, reactive polymer and the fiber. Also, since the soap is hygroscopic, it could introduce water at the reactive polymer-fiber or reactive polymer-matrix resin interphases.

The functional groups of the acidic or basic compounds used as the dispersing agents interact with the functional reactive groups of the reactive polymer to form a "salt." Examples of acidic dispersing agents are organic acids. The organic acid can interact with a basic functional group, such as with an amine group to form a hydrophilic ammonium salt. The preferred organic acids are short chain organic acids represented by the formula

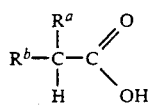

where $R^a$ is a straight or branched chain alkyl group containing from about 1 to about 9 carbon atoms, and $R^b$ is hydrogen or a hydroxyl group. The most preferred organic acids are those of the above formula wherein $R^a$ is 1 to 4 carbon alkyl group such as a methyl or ethyl group, and $R^b$ is a hydroxyl group. Excellent results were obtained when the organic acid used was lactic acid.

The amount of organic acid employed is determined by the stoichiometry relationship of the acid per 1.0 amine (base) equivalent. The amine equivalent weight (AEW) of the reactive polymer is determined according to the method described by Sidney Siggia in *Quantitative Organic Analysis via Functional Groups,* John Wiley & Sons, Inc. (1963). An amine-containing polymer can be solubilized using as low as about 0.8 carboxyl equivalents of organic acid per 1.0 amine equivalent. However, better dispersion is obtained when at least about 1.0 up to 1.2 carboxyl equivalents of organic acid per 1.0 amine equivalent is used. The upper level of organic acid used is basically limited by practical considerations.

Examples of basic dispersing agents are inorganic or organic bases. This material interacts with an acidic functional group, such as a carboxyl group, to form a hydrophilic salt. Examples of inorganic bases are sodium hydroxide and potassium hydroxide. More preferably the base is an organic amine, preferably a tertiary amine. Examples of these amines are trimethylamine, triethylamine, triisopropyl amine, dimethylbutyl amine, dimethylbenzyl amine, methyldiphenyl amine, triethanol amine, N-methyl peperidine, N-methyl morpholine, triethylenediamine, pyridine, 4,4'-dipyridyl propane, 2,4,6-tri (dimethylaminomethyl) phenol, and the like. Excellent results were obtained when the organic base used was dimethylaminoethanol.

The amount of organic base employed is determined by the stoichiometry relationship of the base per 1.0 carboxyl equivalent. The carboxyl (acid) equivalent weight is calculated as 100 divided by the equivalents per hundred parts by weight of rubber of the carboxyl-containing polymer. A carboxyl-containing polymer can be solubilized using as low as about 0.8 equivalents of base per 1.0 carboxyl equivalent. However, better dispersion is obtained when at least about 1.0 up to 1.2 equivalents of base per 1.0 carboxyl equivalent is used. The upper level of base used is basically limited by practical considerations.

Water is the fourth ingredient in the compositions. The water used can be distilled water, demineralized water, or regular tap water. Advantageously, a large amount of water can be employed without effecting the stability of the water-dispersed reactive liquid polymer compositions. The amount of water used in preparing the composition is at least about 50 parts by weight per 100 parts by weight of the polymer. More preferably, the amount of water employed is from about 100 parts to about 600 parts of water per 100 parts of the polymer. Excellent results were obtained using about 500 parts by weight of water per 100 parts by weight of reactive polymer.

Preferred amine-containing reactive liquid polymer compositions useful in the aqueous dispersions of this invention are readily formed comprising (1) 100 parts by weight of an amine-containing polymer, (2) at least 25 parts by weight of the select solvent, (3) at least about 0.8 equivalent of an organic acid, and (4) at least about 100 parts by weight of water.

The reactive liquid polymer compositions can be prepared by admixing all four components together. However, the preferred method is to first dissolve the polymer in the solvent. The dissolution of the polymer in the organic solvent is enhanced by mild heating and agitation with, for example, a propeller type mixer operating at about 50 to about 300 rpm. Thereafter, the dispersing agent is added to the solvent solution of the liquid polymer with mild agitation. Finally, the water is added slowly with mild agitation to yield a suspension of the polymer in the water. No soap is used to prepare the water-dispersed compositions.

The reactive liquid polymer compositions are preferably "transparent" dispersions as opposed to the milky, opaque appearance of latexes. Although, opaque stable dispersions are also suitable for use in the invention.

In addition to the reactive liquid polymer compositions, the aqueous dispersions further comprise a curing system of an epoxy resin and a curing agent. The curing system and their levels of use with a reactive polymer to produce a cured, elastomeric state are sufficient to cure the reactive liquid polymer composition to an elastomeric coating. Since the elastomeric coating is intended to increase the impact and crack resistance of the vinyl resin composite, less than an amount of the curing system that would detract from these properties is employed. Preferably, the epoxy resins employed are aliphatic and cycloaliphatic epoxides and the diglycidylethers of Bisphenol A. Curing agents which can be employed include aliphatic and aromatic amines, polyamides, and dicyandiamides. The amount of epoxy resin and curing agent employed is a stoichiometric amount based on the amine equivalent weight of the reactive liquid polymer. In the case of the amine-containing polymers, if a relatively large amount of polymer relative to epoxy resin is employed, no additional curing agent need be added. That is, the amine-containing polymer would be considered to intrinsically contain the curing agent. Thus, the amine equivalent in the curing agent is added to the amount of amine equivalent in the reactive polymer and this total is used to determine the stoichiometric amount of epoxy resin. Qualitatively, lower amounts of epoxy resin will provide a better dispersible system; and for polyvinyl chloride resin, a lower amount of amine is preferred for stability reasons. The following table demonstrates the relative amounts of the epoxy resin, curing agent and amine-containing polymer which yield coating formulations with different properties:

TABLE 1

| COMPONENT | EQUIVALENT WEIGHT | A | B | C | D | E | F | G | H |
|---|---|---|---|---|---|---|---|---|---|
| | | (COMPONENT PARTS BY WEIGHT) | | | | | | | |
| Epoxy resin[a] | 190 | 100 | 100 | 100 | 100 | 100 | 100 | 100 | 100 |
| Amine Containing Reactive Polymer[b] | 19 | 50 | 100 | 200 | 300 | 400 | 475 | 550 | 600 |
| Aliphatic Amine Curing Agent | 900 | 9.0 | 7.9 | 5.8 | 3.7 | 1.6 | 0 | 0 | 0 |
| Amine/Epoxy Stoichiometric Ratio | | 1.0 | 1.0 | 1.0 | 1.0 | 1.0 | 1.0 | 1.16 | 1.26 |
| Elongation | | 40[1] | 85[1] | 150[2] | 155[2] | 170[2] | 217[2] | 353[1] | 441[1] |
| Tensile Strength (psi) | | 4100[1] | 3200[1] | 1020[2] | 692[2] | 577[2] | 418[2] | 311[1] | 330[1] |
| Modulus (psi at 100% strain) | | 2130[1] | 2450[1] | 564[2] | 387[2] | 241[2] | 130[2] | 59[1] | 52[1] |

[1]Values are averages of two samples.
[2]Values are averages of three samples.
[a]This resin is the diglycidyl ether of Bisphenol A and is available from Shell Chemical Company as Epon 828.
[b]This polymer is an amine terminated butadiene-acrylonitrile rubber.

As is seen from the table, the ratio of epoxy resin to the reactive liquid polymer composition affects the physical properties of the cured elastomer. Typically, for a given amount of epoxy resin, the tensile strength of a cured elastomer will decrease and the elongation of the cured elastomer will increase with increasing amounts of amine-terminated reactive polymer. Also, the relative levels of epoxy resin and cure agent to reactive polymer given in the table are not limitative. Any stoichiometric level is suitable for use in this invention.

The cure of carboxyl-containing liquid polymer compositions is performed with similar cure systems with similar stoichiometry. For example, U.S. Pat. No. 4,119,592 shows the cure of HYCAR® CTBN using various epoxy resins, amine curatives, and dihydric compounds to yield cured elastomeric products. The ratio of reactive liquid polymer composition to epoxy resin employed has a pronounced effect on tensile properties and elongation properties of the cured elastomer.

The reactive liquid polymer compositions, especially those which contain carbon-carbon unsaturation, can also be conveniently cured using radiation. For example, ultraviolet radiation in the presence of UV sensitizers, infrared radiation in the presence of thermal reactive agents, microwave radiation, and electron-beam radiation can all be employed to assist in the cure of the reactive polymer to an elastomeric coating. Curing in such a manner can provide additional crosslinking.

A preferred reactive liquid polymer composition used in a preferred aqueous dispersion is an amine-terminated liquid polymer composition commercially available from The B. F. Goodrich Company and marketed as HYCAR® ATBN 1300x16 and is used to form an elastomeric coating. The polymer has a polymeric backbone of interpolymerized butadiene and about 16% by weight of acrylonitrile, has a Brookfield viscosity of 200,000 cps at 27° C. (81° F.), and has an amine equivalent weight of about 900. Lactic acid is used as a dispersant and has a carboxyl equivalent weight of 90. The components for this reactive liquid polymer composition as listed in the recipes below are shown in parts by weight.

| | 1 | 2 |
|---|---|---|
| ATBN (1300 × 16) | 20 | 20 |
| Butyl Cellosolve | 20 | 10 |
| Lactic Acid (85% in water) | 3 | 3 |
| Water | 100 | 100 |
| Appearance | Translucent and Stable | Opaque and Stable |

The compositions are prepared by dissolving the ATBN polymer in the butyl cellosolve at a temperature of about 25° C. followed by addition of the lactic acid. Water is then slowly added to the compositions while agitating the mixture at 50 to 300 rpm using an air stirrer with a marine blade.

This amine-terminated liquid poly(butadiene-acrylonitrile) polymer composition is combined with a curative system of a Bisphenol A type epoxy resin having an epoxy equivalent weight of 525 sold as Epi-Rez 520-C, and available in a water-dispersed form as CMD WJ 55-3520 Epoxy Resin from Hi-Tek Polymers, Inc.; and an amine curing agent having an amine equivalent weight of 174, and available in water-dispersed form as CMD WJ60-8537 Curing Agent from Hi-Tek Polymers, Inc. (the amine is dispersed in water, 2-propoxyethanol, and glacial acetic acid). The water dispersions are compatible with each other and are admixed in a common coating pan to yield an aqueous dispersion useful for coating fibers.

Other examples of a preferred reactive liquid polymer composition useful in this invention include an amine-terminated polymer which has a polybutadiene backbone, a Brookfield viscosity of 127,000 cps. at 27° C., and an amine equivalent weight of 1050 (known as AT-RLP-1); an amine-terminated polymer having a backbone of interpolymerized butadiene and acrylonitrile (about 10% by weight), a viscosity of 180,000 cps., and an amine equivalent weight of 1200 (known as AT-RLP-2); an amine-terminated polymer having a backbone of interpolymerized butadiene, acrylonitrile (about 16% by weight), and acrylic acid (about 1.7% by weight) which carboxyl groups were converted to amine groups using the teachings of U.S. Pat. No. 4,133,957, a viscosity of 460,000 cps, and an amine equivalent of about 800 (known as AT-RLP-3). The components used in the recipes below are shown in parts by weight.

|  | 1 | 2 | 3 |
|---|---|---|---|
| AT-RLP-1 | 20 | — | — |
| AT-RLP-2 | — | 20 | — |
| AT-RLP-3 | — | — | 20 |
| Butyl Cellosolve | 20 | 20 | 20 |
| Lactic Acid | 3 | 3 | 3 |
| Water | 100 | 100 | 100 |
| Appearance | Translucent and Stable | Translucent and Stable | Translucent and Stable |

These compositions can be diluted with additional water to provide stable aqueous dispersions of as low as 0.1% polymer.

A stable, translucent composition is prepared using a mono-functional amine-terminated polymer having a polymeric backbone comprised of interpolymerized butadiene and acrylonitrile (about 16% by weight). The amine-terminated polymer has a viscosity of 64,000 cps. and an amine equivalent weight of 2500. The recipe used is 10 parts by weight of polymer, 10 parts by weight of butyl cellosolve, 1.5 parts by weight of lactic acid, and 50 parts by weight of water.

Another stable, translucent composition is prepared using an amine-containing polymer having a polymeric backbone comprised of carbon-oxygen linkages. The amine-terminated polyether used is known as D-2000, which is commercially available from Texaco, Inc. through its Jefferson Chemical Co. subsidiary. The polymer is a polyoxypropyleneamine which has an average molecular weight of about 2000, a viscosity of about 265 centipoise at 25° C., and an amine equivalent weight of 1040. The recipe used is 20 parts by weight of D-2000, 20 parts by weight of butyl cellosolve, 3 parts by weight of lactic acid and 100 parts by weight of water.

A stable, translucent composition can also be prepared using another amine-containing polymer having a higher molecular weight and a polymeric backbone comprised of carbon-oxygen linkages. The amine-terminated polymer used is known as HC-1101, which is commercially available from The 3M Co. The polymer has an average molecular weight of 10,000, and an amine equivalent weight of 4610. The polymer is a low-melting solid at room temperature. Hence, the polymer is heated to about 50° C. and used in a liquid state. The recipe used is 10 parts by weight of HC-1101, 10 parts by weight of butyl cellosolve, 1.5 parts by weight of lactic acid and 50 parts by weight of water.

Carboxyl-terminated polymers commercially available from The B. F. Goodrich Company marketed as HYCAR® CTBN can also be used to prepare water-dispersed, carboxyl-containing liquid polymer compositions useful in this invention.

The compositions are prepared by dissolving the CTBN polymer in a solvent, preferably, butyl cellosolve, at a temperature of about 25° C. followed by addition of the respective dispersing agent, which is an organic base. Water is then slowly added to the compositions while agitating the mixture at 50–300 rpm using an air stirrer with a marine blade. The CTBN polymers are described as follows: CT-RLP-1 has a backbone of interpolymerized units of butadiene and acrylonitrile (about 10% by weight), a Brookfield viscosity of 60,000 cps. at 27° C., and a carboxyl equivalent weight of about 2000; CT-RLP-2 has a backbone of interpolymerized butadiene and acrylonitrile (about 18% by weight), a viscosity of 135,000 cps., and a carboxyl equivalent weight of 1920; and CT-RLP-3 has a backbone of interpolymerized butadiene and acrylonitrile (25% by weight), a viscosity of 500,000 cps, and a carboxyl equivalent weight of 1750. The organic base is used in the preparation at 1.0 equivalent per 1.0 carboxyl equivalent. The components used in the recipes below are shown in parts by weight.

|  | 1 | 2 | 3 | 4 | 5 | 6 |
|---|---|---|---|---|---|---|
| CT-RLP-1 | 20 | — | — | — | — | — |
| CT-RLP-2 | — | 20 | — | 20 | 20 | 20 |
| CT-RLP-3 | — | — | 20 | — | — | — |
| Butyl Cellosolve | 20 | 20 | 20 | 20 | 20 | 20 |
| Dimethylaminoethanol | 1 | 1 | 1 | — | — | — |
| Imidazole | — | — | — | 0.7 | — | — |
| 2-Methyl Imidazole | — | — | — | — | 0.8 | — |
| 2-Methyl-4-Ethyl Imidazole | — | — | — | — | — | 1.1 |
| Water | 100 | 100 | 100 | 100 | 100 | 100 |

All of the compositions are stable and translucent. These compositions can also be diluted with additional water to provide stable aqueous dispersions with as low as 0.1% polymer.

A stable, translucent composition can be prepared using a carboxyl-terminated polymer having a polymeric backbone comprised of interpolymerized butadiene. The polymer has a viscosity of 60,000 cps. and a carboxyl equivalent weight of 2220. The recipe used is 20 parts by weight of polymer, 20 parts by weight of butyl cellosolve, 1 part by weight of dimethylaminoethanol and 100 parts by weight of water.

Another stable, translucent composition can be prepared using a carboxyl-containing polymer having a polymeric backbone comprised of interpolymerized units of butadiene, acrylonitrile (about 18% by weight), and acrylic acid (1.7% by weight). The polymer has both terminal and pendant carboxyl groups. The polymer has an average molecular weight of about 3600, a viscosity of about 160,000 centipoises at 27° C., and a carboxyl equivalent weight of about 1490. The recipe used is 20 parts by weight of polymer, 20 parts by weight of butyl cellosolve, 1 part by weight of dimethylaminoethanol and 100 parts by weight of water.

The aqueous dispersions can be used to coat fibers in the form they are prepared. However, as mentioned above, it is advantageous to dilute the compositions with additional water and use them in the form of a dispersion containing about a 0.1% to about 5% by weight of reactive polymer. More preferably, the aqueous dispersions are used containing about 0.25% to about 2% by weight of reactive polymer.

The use of the aqueous dispersions described herein have a substantial advantage over the use of a latex or a solvent solution in that the aqueous dispersions can be diluted down to very low levels of total solids and yet remain stable for use. Latexes are typically high solids dispersions, and attempts to dilute them down to low levels usually result in instability of the system and coagulation. Further, latexes typically employ high levels of traditional soaps which is undesirable. With solvent solutions, although a low total solids level can be obtained, the use of large levels of solvent is undesirable.

The fibers employed in this invention can be any solid synthetic or natural fiber. Examples of such fibers are glass fibers, graphite fibers, and asbestos fibers; natural organic fibers such as wool and cotton; and synthetic fibers such as polyaramide fibers, polyester fibers, nylon fibers, and polyolefin fibers such as polyethylene and polybutylene fibers. Since one of the primary uses of the aqueous dispersions containing the reactive liquid polymer compositions is to provide impact modification of brittle substances, the preferred fibers to coat with the reactive polymers are those fibers which are used as strengthening materials for such substances. Hence, glass fibers and graphite fibers would represent the large volume fibers typically used in these applications. Of all of the fibers, the glass fibers are the most preferred type of fiber used in this invention.

Several processes may be used to provide a thin and continuous elastomeric coating on the fibers. For example, the work done by J. K. Kawamoto et al, described in the thesis referenced on page 4 hereof, showed that thin and continuous films on graphite fiber may be achieved using solvent solutions of a reactive polymer and working under exacting conditions. Also, the work done by J. P. Bell et al, described in the ACS article referenced on page 4 hereof, showed that thin and continuous films on graphite fiber could be achieved using electropolymerization techniques and employing a monomeric electrolyte solution. However, these processes are not entirely satisfactory. The present process of coating fibers using the water-dispersed, reactive liquid polymer compositions described above results in excellent uniformly thin and continuous elastomeric coatings on fibers. By thin is meant a film coating of up to about 0.2 micron in thickness and having a ratio of film thickness to diameter of the fiber of no more than 1:10 and preferably of 1:50 or less. When the film thickness to fiber diameter ratio is greater than 1:10, the reinforcing effectiveness of the fiber is seriously impaired by the compliance of the elastomeric film. The thickness of the polymer film coated on the fiber is proportionate to the concentration of the polymer in the dispersion. For example, aqueous dispersions having concentrations by weight of polymer of 0.5%, 1.0%, 2.0% and 3.0% form films on fibers of 0.010, 0.036, 0.062, and 0.114 micron in thickness, respectively. The coatings, after cure, are immersed in acetone to establish that the reactive polymer is in fact in a cured state. Pictures taken by scanning electron microscopy show the elastomeric coatings to be uniformly thin and continuous. The ratio of the thickness of the film to fiber diameter (7 microns) ranges from about 1:700 to about 1:50.

A preferred process used to coat the fibers is to draw the fibers through the aqueous dispersion composition containing the reactive liquid polymer composition, epoxy resin and curing agent, and then drying and curing the coating to an elastomeric film. Likewise, if a filler is employed in the composite, this process can be used to coat it. The preferred process is further described as follows using an amine-terminated liquid polymer composition as an exemplary reactive polymer.

An amine-terminated reactive liquid polymer composition having a poly(butadiene-acrylonitrile) backbone is first formed by dissolving the polymer in a select solvent such as butyl cellosolve, adding an organic acid such as lactic acid, followed by the addition of water. An epoxy resin and curing agent are added as a curing system to the reactive liquid polymer composition to provide the aqueous dispersion coating compositions.

The fibers, prior to entering the coating chamber, are separated from the strand into individual fibers, such as by an air jet. The fibers are drawn through the coating compositions in the chamber at a set rate. The coated fiber filaments are then passed through a drying region and a curing region. The drying is effected at a temperature and for a time sufficient to evaporate the solvent and water. Drying can be accomplished using a hot gas stream such as heated air or in a vacuum, at temperatures of from about 50° C. to about 120° C. for about 10 seconds to 60 seconds or more. Curing times and temperatures depend upon the type of curing mechanism and type of curative ingredients employed. Typically, curing times range from about thirty seconds to 60 minutes or more at temperatures of about 50° C. to about 150° C. The drying region and curing region can be part of the same continuous area.

The fiber can be used as acquired, or cleaned and/or pre-treated prior to coating with the reactive polymer. If the fibers and reactive polymers do not themselves form a strong interfacial bond, the fibers can be pre-treated using known sizings to promote effective bonding between the fiber and the reactive polymer elastomeric film. It is important that the individual fibers have good and sufficient contact with the reactive polymer and curing agents, and that the coated fibers are dried and at least partially cured to a non-blocking state prior to contact with each other.

The elastomeric coated fibers are preferably added to the vinyl resin composition which is in a molten state. The fibers are preferably mixed and then blended into the resin to distribute the fibers throughout the resin substantially uniformly. Although the fibers may be crushed and broken during the blending and mixing, the strands are long enough to provide reinforcement. The amount of fibrous reinforcement used will vary according to the final intended use; however, this amount typically ranges from about 3% to 70%. The resin and fiber mixture is then subjected to conventional molding conditions such as extrusion, injection molding, pultrusion, thermoforming or compression molding. The composites have an advantageous combination of stiffness and impact and crack resistance due to the presence of the elastomeric coated fiber.

The following examples illustrate the invention described herein. The examples are not to be construed as limiting in any way the scope of the invention.

EXAMPLE 1

A homopolymer of polyvinyl chloride has an intrinsic viscosity of 0.53, and is mixed at 100 parts by weight with 3 parts thiotin stabilizer, 3 parts acrylic process aid, 4 parts of lubricants and 16 parts of an impact modifier. After blending this mixture, it is banded onto a two-roll mill at 350° F. and mixed for two minutes. Sample 1 uses graphite fibers with a coating prepared from an 0.5% aqueous solution of an amine-terminated reactive liquid poly(butadiene-acrylonitrile) polymer composition known as HYCAR ® ATBN 1300x16, available from The B. F. Goodrich Company, 1 part of a Bisphenol A based epoxy resin in water and 2-propoxy ethanol known as Epi-Rez 520-C Epoxy Resin available from Hi-Tek Polymer Inc., and 0.5 part of a water soluble amine adduct in water, 2-propoxy ethanol and glacial acetic acid curing agent available from Hi-Tek Polymer Inc., per 10 parts of the amine-terminated polymer.

Sample 2 uses graphite fibers coated with a 1.0% aqueous solution of the amine-terminated reactive liquid polymer composition and the same epoxy resin and amine curing agent as Sample 1 uses. Sample 3 uses graphite fibers coated with a 2.0% aqueous solution of the amine-terminated reactive liquid polymer composition and the same epoxy resin and amine curing agent that is used in Sample 1. The fibers are mixed at 20 weight percent into the molten resin, blended for two minutes, taken off the mill and cut into blanks, keeping the predominant direction of the fiber in the long direction of the sample piece. The blanks are compression molded into ⅛-inch thick bars at about 350° F. and have the following physical properties:

TABLE I

| Sample # | Flexural Strength (PSI) | Flexural Modulus (PSI) | Notched Izod (ft-lb/in) | Density (gm/cc) |
|---|---|---|---|---|
| 1 (0.5% ATBN) | 20,125 | 1,620,000 | 1.28 | 1.371 |
| 2 (1.0% ATBN) | 18,292 | 1,442,000 | 1.25 | 1.372 |
| 3 (2.0% ATBN) | 19,646 | 1,514,000 | 1.27 | 1.373 |

EXAMPLE 2

A homopolymer of polyvinyl chloride available from The B. F. Goodrich Company as Geon® 86 (0.68 Intrinsic Viscosity) is reinforced with glass fibers coated with an aqueous dispersion comprised of a reactive liquid polymer composition comprising 20 parts by weight of an amine-terminated reactive polymer which has a polybutadiene backbone, a Brookfield viscosity of 127,000 cps. at 27° C., and an amine equivalent weight of 1050; 20 parts by weight butyl cellusolve, 3 parts by weight lactic acid, and 100 parts by weight of water. The same types and amount of epoxy resin and curing agent as used in Example 1 are used. Additional water is added to provide a composition with 1.0% of the polymer and 2.0% of the polymer. One hundred parts by weight of the resin is mixed with the same amounts of thiotin stabilizer, acrylic process aid, and lubricant, and processed as the resin in Example 1. Two composite samples are prepared, one containing 20% by weight of glass fibers coated with the 1% by weight aqueous solution of the amine-terminated polybutadiene liquid polymer composition, and the other containing 20% by weight of glass fibers coated with the 2% by weight solution of the amine-terminated polybutadiene liquid polymer composition. After blending and compression molding into ⅛-inch thick bars, the samples had the following properties:

TABLE II

| Sample # | Flexural Strength (PSI) | Flexural Modulus (PSI) | Notched Izod (ft-lb/in) | Density (gm/cc) |
|---|---|---|---|---|
| 1 (1.0% ATBN) | 15,433 | 808,000 | 1.00 | 1.507 |
| 2 (2.0% ATBN) | 16,961 | 981,000 | 0.97 | 1.503 |

What is claimed is:

1. A fiber reinforced vinyl resin composite comprising:
   (1) a vinyl resin composition;
   (2) a fibrous reinforcement material coated with a uniformly thin and continuous cured elastomeric coating obtained from an aqueous dispersion containing a reactive liquid polymer composition, wherein said reactive liquid polymer composition is comprised of:
   (a) 100 parts by weight of a reactive polymer having a Tg value of below 0° C. and an average molecular weight of from about 200 to about 10,000;
   (b) at least 10 parts by weight of a solvent;
   (c) an acidic or basic dispersing agent; and
   (d) at least about 50 parts by weight of water; said coating resulting from the drying and curing of said reactive liquid polymer composition; wherein said reactive liquid polymer is represented by the following formula;

$$Y_n(PB)$$

wherein Y is either a univalent, reactive radical selected from the group consisting of carboxy groups, amine groups, mercaptan groups, hydroxy groups, phenolic groups and vinylidene groups or a monomeric unit of the polymeric backbone; n is an integer from 1 to about 10; and PB is a polymeric backbone comprising carbon-carbon or carbon-oxygen linkages; provided that when Y is a monomeric unit of the polymeric backbone, that the polymeric backbone contains vinylidene groups;
   (e) and a curing agent for said reactive liquid polymer.

2. The composite of claim 1 wherein the reactive polymer is a carboxyl-terminated liquid polymer or an amine-terminated liquid polymer which has a polymeric backbone comprised of interpolymerized units of from about 50% to about 99.6% by weight of a diene, up to about 40% by weight of a vinyl nitrile or vinyl aromatic, and up to about 10% by weight of a vinyl acid, and has a carboxyl or an amine content of from about 0.4% to about 10% by weight, all weights based upon the weight of the polymer.

3. The composition of claim 2 wherein the solvent is present in the reactive liquid polymer composition from about 50 to about 500 parts by weight based on 100 parts by weight of the polymer, and the dispersing agent is either an organic acid employed at a level of at least 0.8 carboxyl equivalent of organic acid for every 1.0 amine equivalent, or a base employed at a level of at least about 0.8 equivalent of base for every 1.0 carboxyl equivalent.

4. The composite of claim 3 wherein the fiber employed is graphite fiber or glass fiber.

5. The composite of claim 4 wherein the solvent is butyl cellusolve.

6. The composite of claim 5 wherein the organic acid is lactic acid.

7. The composite of claim 5 wherein the base is a tertiary amine.

8. The composite of claim 5 wherein the base is selected from the group consisting of dimethylaminoethanol, imidazole, 2-methyl imidazole, and 2-methyl-4-ethyl imidazole.

9. The composite of claim 2 further comprising an epoxy resin and epoxy resin curing agent used in the form of a water dispersion which is admixed with said reactive liquid polymer composition.

10. The composite of claim 9 wherein the epoxy resin is a diglycidyl ether of Bisphenol A and the curing agent is an amine curing agent.

11. The composite of claim 5 wherein the vinyl resin composition is a vinyl halide resin.

12. The composite of claim 11 wherein the vinyl halide resin is a homopolymer of polyvinyl chloride or chlorinated polyvinyl chloride or an alloy of a vinyl halide resin or chlorinated vinyl halide resin and an alloying polymeric composition.

* * * * *